United States Patent
Chou

(10) Patent No.: US 8,049,717 B2
(45) Date of Patent: Nov. 1, 2011

(54) PORTABLE COMPUTER

(75) Inventor: Peng-Hui Chou, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 788 days.

(21) Appl. No.: 11/773,970

(22) Filed: Jul. 6, 2007

(65) Prior Publication Data

US 2008/0052635 A1  Feb. 28, 2008

(30) Foreign Application Priority Data

Aug. 22, 2006 (TW) ............................... 95130772 A

(51) Int. Cl.
G09G 5/00  (2006.01)
(52) U.S. Cl. ........................................ 345/156; 345/169
(58) Field of Classification Search ............... 345/1.1–5, 345/156–169, 173–178
See application file for complete search history.

(56) References Cited

U.S. PATENT DOCUMENTS

| | | | | |
|---|---|---|---|---|
| 5,613,135 A * | 3/1997 | Sakai et al. | ...................... | 710/62 |
| 5,768,164 A | 6/1998 | Hollon, Jr. | | |
| 5,905,914 A * | 5/1999 | Sakai et al. | ...................... | 710/67 |
| 6,297,794 B1 * | 10/2001 | Tsubouchi et al. | ........... | 345/204 |
| 6,910,157 B1 | 6/2005 | Park et al. | | |
| 7,577,522 B2 * | 8/2009 | Rosenberg | ...................... | 701/213 |
| 7,730,401 B2 * | 6/2010 | Gillespie et al. | .............. | 715/702 |
| 2002/0191029 A1 * | 12/2002 | Gillespie et al. | .............. | 345/810 |
| 2005/0024341 A1 * | 2/2005 | Gillespie et al. | .............. | 345/173 |
| 2006/0044283 A1 * | 3/2006 | Eri et al. | ........................ | 345/173 |

FOREIGN PATENT DOCUMENTS

| | | |
|---|---|---|
| JP | 2001306291 | 11/2001 |
| TW | 200508955 | 3/2005 |

OTHER PUBLICATIONS

"Office Action of Taiwan Counterpart Application", issued on Jan. 28, 2011, p1-p4, in which the listed reference was cited.

* cited by examiner

Primary Examiner — Vijay Shankar
(74) Attorney, Agent, or Firm — Jianq Chyun IP Office

(57) ABSTRACT

A portable computer includes a main body, a display and a status reminder apparatus. The status reminder apparatus is provided on the main body or the display for displaying a reminder message, such as time, the email-receiving status, the program status of instant communication, meeting reminder information and so on, so that users can not forget a time or a meeting when playing computer games in full screen mode, and can receive the latest information at any time.

12 Claims, 4 Drawing Sheets

PORTABLE COMPUTER

CROSS-REFERENCE TO RELATED APPLICATION

This application claims the priority benefit of Taiwan application serial no. 95130772, filed Aug. 22, 2006. All disclosure of the Taiwan application is incorporated herein by reference.

BACKGROUND OF THE INVENTION

1. Field of the Invention

The invention relates to a portable computer and, more particularly, to a portable computer with a status reminder apparatus.

2. Description of the Related Art

In the past, notebooks are usually used in business. But since the efficiencies of portable computers have been improved, portable computers gradually replace desktop computers to be office computers, and even many consumers begin to use notebooks as entertainment devices for seeing a movie, listening to music, playing computer games, or playing online games.

Due to the large market of the computer games and the tendency that the notebook computers supersede desktop computers, many computer companies begin to produce notebook computers dedicated for playing computer games. They are provided with the latest Central Process Unit (CPU), the intermediate or advanced graphics card, and sufficient memory. In addition, some computer companies also produce wide screen notebooks to let users enjoy excellent visual effects when playing games.

FIG. 1 is the schematic diagrams showing a user playing computer games on a conventional notebook computer. Referring to FIG. 1, generally speaking, when a user plays a computer game on a computer 100, the display 110 would be in full screen mode to make users have a real visual effect. However, when the display 110 is in full screen mode, the taskbar at the bottom of the display cannot be displayed. For instance, when the notebook computer is under a normal operation, various information such as time, email-receiving status, or instant message of an instant-message application program is shown at the bottom of the display 110. When playing computer games, users may neglect the playing time, an important e-mail, or the timeliness of a new message because they cannot see the information originally shown at the bottom of the display 110.

BRIEF SUMMARY OF THE INVENTION

The objective of the invention is to provide a portable computer, on which a status reminder apparatus is provided at its main body or display for displaying a reminder message, such as time, email-receiving status, instant message of an instant-message application program, meeting reminder information and so on, so that when playing computer games in full screen mode, users may obtain the latest information at any time.

To achieve the above or other objectives, the invention provides a portable computer including a main body, a display, and a status reminder apparatus. The main body is for processing electronic data. The display is pivotally connected to one side of the main body for displaying the output of the electronic data processing. The status reminder apparatus is provided on the main body for displaying a reminder message.

In one embodiment of the invention, the status reminder apparatus is provided at the main body near the hinge between the main body and the display.

In one embodiment of the invention, the status reminder apparatus may be a liquid crystal display panel, an organic light emitting diode (OLED) module or a light emitting diode module.

In one embodiment of the invention, the reminder message at least includes time, email-receiving status, instant message-receiving status, internet-phone notification, meeting reminder, sound volume status, MP3-playing information, weather information, or the combination thereof.

In one embodiment of the invention, the reminder message includes text, a number, a symbol, an image or the combination thereof.

To achieve the above or other objectives, the invention provides another portable computer including a main body, a display and a status reminder apparatus. The main body is for processing electronic data. The display is pivotally connected to one side of the main body for displaying the output of the electronic data processing. The status reminder apparatus is provided on the main body for displaying a reminder message.

In one embodiment of the invention, the status reminder apparatus is provided on the display away from the hinge between the main body and the display.

In one embodiment of the invention, the portable device further includes a network camera which is used to capture image data. The network camera is integrated into the status reminder apparatus.

In one embodiment of the invention, the status reminder apparatus may be a liquid crystal board, an organic light emitting diode (OLED) module or a light emitting diode module.

In one embodiment of the invention, the reminder information at least includes a time, the email-receiving status, the instant message reminder, the internet phone notification, a meeting reminder, the volume notification, the MP3-playing information, the status of weather, or their combination.

In one embodiment of the invention, the reminder message above is used to display a word, a number, a symbol, an image or their combination.

The portable computer of the invention provides a status reminder apparatus on the main body or the display to display a reminder message, such as time, email-receiving status, instant message-receiving status, internet-phone notification, meeting reminder, sound volume status, MP3-playing information, weather information, or the combination thereof.

These and other features, aspects, and advantages of the present invention will become better understood with regard to the following description, appended claims, and accompanying drawings.

DETAILED DESCRIPTION OF THE EMBODIMENTS

Figure 1:
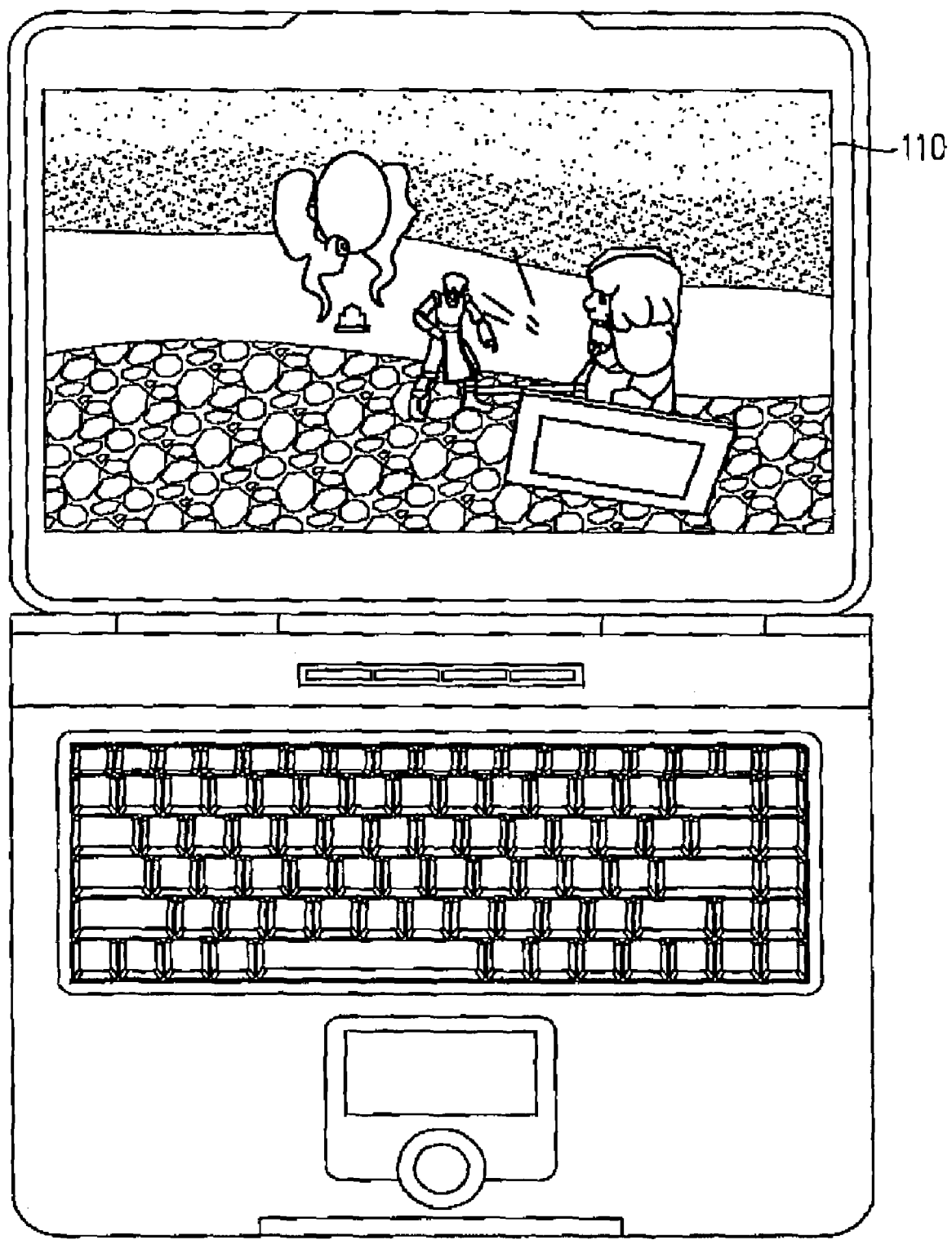
FIG. 1 is a schematic diagram showing a conventional notebook computer being operated by a using to play a computer game.
Figure 2:
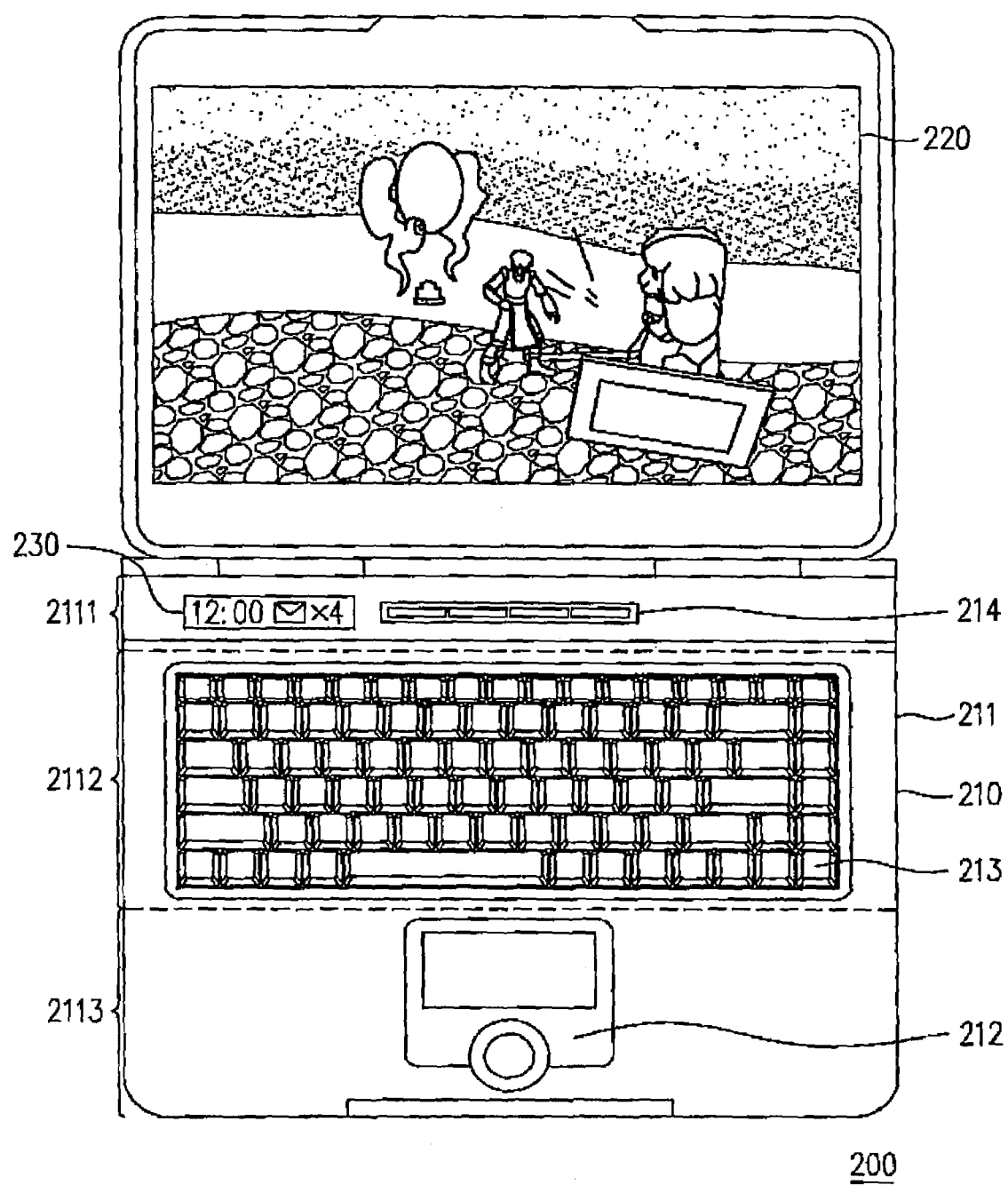
FIG. 2 is a schematic diagram showing a top view of an opened portable computer according to an embodiment of the invention.

FIG. 2 is a schematic diagram showing a top view of an opened portable computer according to an embodiment of the invention. Referring to FIG. 2, the portable computer 200 includes a main body 210, a display 220 and a status reminder apparatus 230.

In this embodiment, the portable computer is a notebook computer, and in other embodiments the portable computer may be a tablet personal computer (Tablet PC), a palmtops, an ultra mobile personal computer (UMPC), etc., and the invention has no limitation about this.

Figure 3:
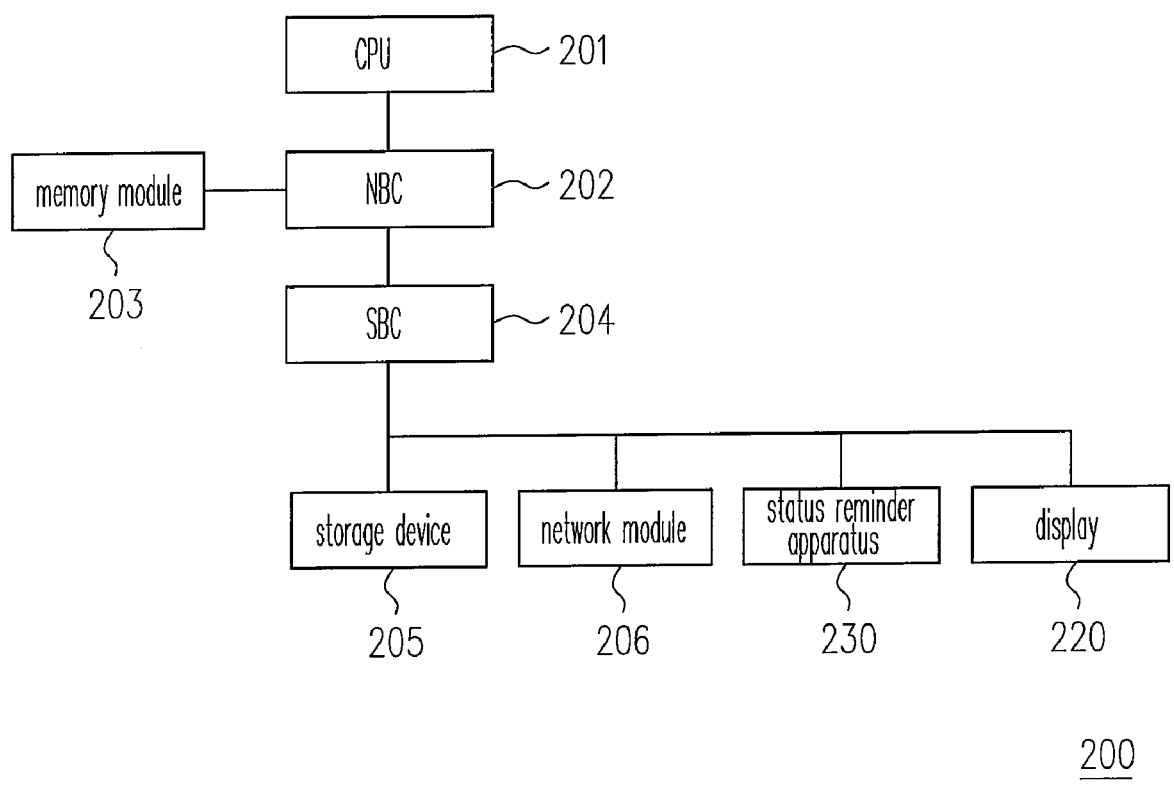
FIG. 3 is a functional block diagram showing a portable computer according to an embodiment of the invention.

FIG. 3 is the functional block diagram showing a portable computer according to the embodiment of the invention. In FIG. 3, the portable computer includes a central processing unit (CPU) 201, a north-bridge chip (NBC) 202, a memory module 203, a south-bridge chip (SBC) 204, a storage device 205, a network module 206, a display 220 and a status reminder apparatus 230. The central processing unit (CPU) 201, the NBC 202, the memory module 203, the SBC 204, the storage device 205, the network module 206, and the network module 206 mentioned above are assembled in the main body 210.

The CPU 201 is electrically connected to the NBC 202. The NBC 202 is electrically connected to the CPU 201, the memory module 203, and the SBC 204, respectively. The SBC 204 is electrically connected to the storage device 205, the network module 206, the NBC 202, and the memory module 203, respectively.

In the embodiment, the storage device 205 is a nonvolatile storage device, such as a disk drive. In other embodiments, the storage device 205 may be other nonvolatile storage device, such as a flash memory.

The above CPU 201 can execute various kinds of application program instructions to control the operation of the portable computer 200. The storage device 205 is used to store data and application programs. For instance, the storage device 205 can store an operating system, video data, a document-processing application program, an instant-message application program, an e-mail application program, and other application programs. The above memory module 203 is used to store the data and application programs which are needed when the CPU 201 operates.

The above NBC 202 is used to communicate with the CPU 201, the memory module 203, the data transfer bus, and the SBC 204. The SBC 204 is responsible for communicating with the output/input interface, the peripheral devices, and so on. The network module 206 may be a wired network module or a wireless network module, which links the portable computer 200 to the internet.

Although the CPU 201, the NBC 202 and the SBC 204 are three independent components in the embodiment, in other embodiments, the NBC 202 may be integrated into the CPU 201 as one component. The NBC 202 and the SBC 204 may also be integrated into the CPU 201 as one component.

As for the illustration of the preferring embodiment of the invention, please refer to FIG. 2 and FIG. 3 simultaneously. The above display 220 is pivotally connected to the main body 210. The main body 210 is the core of the whole portable computer 200, and can process data, image, video and link with the network through the CPU 201, the NBC 202, the memory module 203, the SBC 204, the storage device 205, and the network module 206. For instance, when the user playing on-line games, the on-line game programs stored in the storage device 205 is executed, and is loaded to the memory module 203 for the CPU 201 and the NBC 202 to execute. Of course, meanwhile the SBC 204, the network module 206 and the graphics chip electrically connected to the SBC 204 also begin to operate. Furthermore, the display 220 displays game frames in full screen mode.

As mentioned above, when displaying in full screen mode, the display 220 cannot simultaneously display time, the email-receiving status, volume information, etc. Therefore, one preferred embodiment of the invention provides a status reminder apparatus 230 to display the reminder information. For instance, the status reminder apparatus 230 is disposed on the main body 210 near the hinge between the main body 210 and the display 220 to display the reminder information. That is, the main body 210 has a housing 211 including a first surface area 2111, a second surface area 2112 and a third surface area 2113. A hotkey group 214 and the status reminder apparatus 230 are provided on the first surface area 2111. The keyboard 213 is provided on the second surface area 2112. The touch-sensitive module 212 is provided on the third surface area 2113. In the embodiment, the status reminder apparatus 230 is provided on the first surface area 2111, which is different from the area that the touch control module 212 is provided. In other embodiments, the status reminder apparatus 230 and the touch control module 212 may be provided on the same area, such as the third surface area.

In the embodiment, the status reminder apparatus 230 is a micro liquid crystal display module. In other embodiments, the status reminder apparatus 230 also may be an organic light emitting diode module or a light emitting diode module. Additionally, in the embodiment, the status reminder apparatus 230 can use texts, numbers, symbols, images, and the combination thereof to display a reminder information. In the embodiment, the reminder information includes both time and the email-receiving status. In other embodiments, the reminder information may also include the instant message reminder, the internet phone notification, a meeting reminder, the volume notification, the MP3-playing information, or the status of weather.

The status reminder apparatus 230 can be initiated with the portable computer 200. Alternatively, it can be initiated by pressing the keyboard 213 or a key of the hotkey group 214, or by executing an application program.

Moreover, when the user plays a game in full screen mode, the portable computer 200 may continue to run the e-mail programs, instant message programs. Since an application program of the status reminder apparatus 230 (refer to as a reminder application program hereinbelow) begins to be executed along with the initiation of the status reminder apparatus 230, the reminder application program receives the status of e-mail programs, instant message programs, or the system information of the portable computer 200 to get the information on the email-receiving status, the instant message reminder, time, etc. The information is displayed by the status reminder apparatus 230. Of course, the status reminder apparatus 230 can display a reminder message in a rolling text style.

Therefore, when playing computer games in full screen mode, users can receive various kinds of reminder information displayed by the status reminder apparatus 230 of the portable computer 200, such as instant message notification or meeting reminder. The users will not neglect the instant message received or forget the time for the meeting when playing computer games in full screen mode, therefore it is helpful to enhance the timeliness of information reception.

Figure 4:
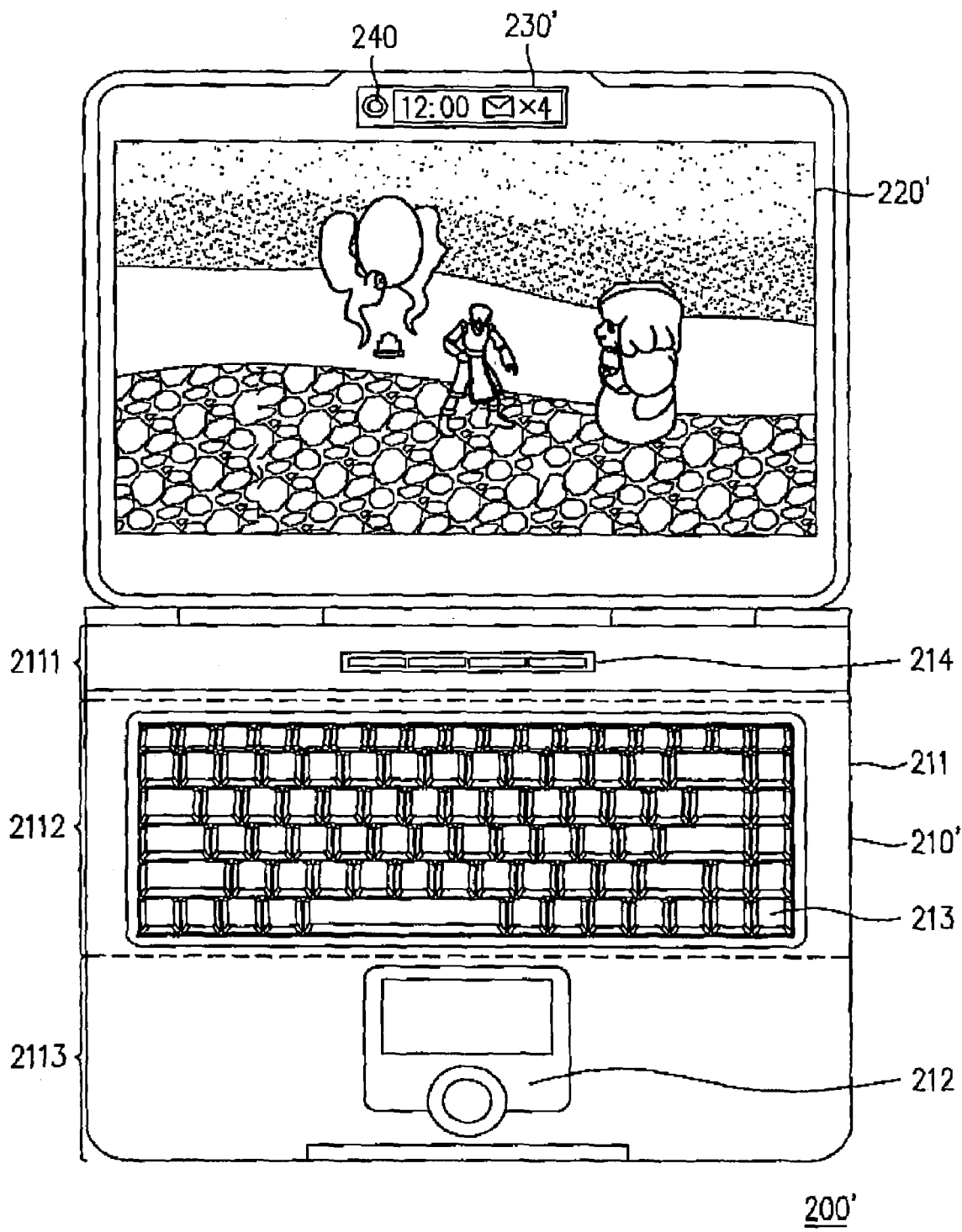
FIG. 4 is a schematic diagram showing a top view of an opened portable computer according to another embodiment of the invention.

FIG. 4 is a schematic diagram showing a top view of an opened portable computer according to another embodiment of the invention. In this embodiment, the structure of the portable computer 200 is basically the same as the structure of the portable computer 200 shown in the FIG. 2. The difference between them is that the status reminder apparatus 230' shown in FIG. 4 is provided on one side of the display 220'. In this embodiment, the status reminder apparatus 230' is provided on the display 220' away from the hinge of the main body 210'. The status reminder apparatus 230' can be used as a small head up display. In other embodiments, the status reminder apparatus 230' also can be provided on the side of the display near the main body 210'.

Similarly, when playing computer games in full screen mode, users may know time, the email-receiving status or the receiving status of a message, meeting reminder information, etc. from the status reminder apparatus 230'. The users will not forget time or meetings when playing computer games in full screen mode, and can receive the latest information at any time.

In this embodiment, the portable computer 200' further includes a network camera 240 which is used to capture image data. The network camera is integrated into the status reminder apparatus 230 to make the modeling of the portable computer 200' more beautiful.

In summary, the portable computer of this invention provides a status reminder apparatus on the main body or the display for displaying a reminder message. Therefore, users would not forget time or meetings when playing computer games in full screen mode, and can receive the latest information simultaneously.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A portable computer, comprising:
a main body for processing at least one application;
a display pivotally connected to one side of the main body for displaying the processing result of one of the applications in a full screen mode; and
a status reminder apparatus provided at the main body for receiving a status of each application to get instant information and displaying the instant information as a reminder message, wherein the instant information comprises an instant message reminder, an internet phone notification, a meeting reminder, a volume notification, MP3-playing information, a status of weather, an email status or time information and a detailed content thereof which is displayed by using text, numbers, symbols, images, or the combination thereof.

2. The portable computer according to claim 1, wherein the status reminder apparatus is provided at the main body near the hinge between the main body and the display.

3. The portable computer according to claim 1, wherein the status reminder apparatus is a liquid crystal display panel, an organic light-emitting diode (OLED) module, or a light-emitting diode module.

4. The portable computer according to claim 1, wherein the reminder message includes time and the email-receiving status.

5. The portable computer according to claim 1, wherein the status reminder apparatus is used to display a text, a number, a symbol, an image, or a combination thereof.

6. A portable computer, comprising: a main body for processing at least one application;
a display pivotally connected to one side of the main body for displaying the processing result of one of the applications in a full screen mode; and
a status reminder apparatus provided on the display for receiving a status of each application to get instant information and displaying the instant information as a reminder message, wherein the instant information comprises an instant message reminder, an internet phone notification, a meeting reminder, a volume notification, MP3-playing information, a status of weather, an email status or time information, and a detailed content thereof which is displayed by using text, numbers, symbols, images, or the combination thereof.

7. The portable computer according to claim 6, wherein the status reminder apparatus is provided on the display away from the hinge between the main body and the display.

8. The portable computer according to claim 7, further comprising a network camera for capturing image data, wherein the network camera is integrated into the status reminder apparatus.

9. The portable computer according to claim 6, wherein the status reminder apparatus is a liquid crystal display panel, an organic light emitting diode (OLED) module, or a light emitting diode module.

10. The portable computer according to claim 6, wherein the reminder message includes time and email-receiving status.

11. The portable computer according to claim 6, wherein the status reminder apparatus is used to display text, a number, a symbol, an image or a combination thereof.

12. A portable computer, comprising: a main body for processing at least one application;
a display pivotally connected to one side of the main body for displaying the processing result of one of the applications in a full screen mode; and
a status reminder apparatus provided at the main body for receiving a status of each application to get instant information and displaying the instant information;
wherein the instant information comprises a detailed content to show the status of each application, the status reminder apparatus displaying the detailed content by using text, numbers, symbols, images, or the combination thereof.

* * * * *